US008417776B2

(12) United States Patent
Womack et al.

(10) Patent No.: US 8,417,776 B2
(45) Date of Patent: Apr. 9, 2013

(54) ONLINE EVIDENCE COLLECTION

(75) Inventors: Roy Womack, Carrollton, TX (US); Todd G. Shipley, Reno, NV (US)

(73) Assignee: Vere Software, Inc., Reno, NV (US)

( * ) Notice: Subject to any disclaimer, the term of this patent is extended or adjusted under 35 U.S.C. 154(b) by 181 days.

(21) Appl. No.: 12/197,890

(22) Filed: Aug. 25, 2008

(65) Prior Publication Data

US 2009/0089361 A1 Apr. 2, 2009

Related U.S. Application Data

(60) Provisional application No. 60/966,128, filed on Aug. 25, 2007.

(51) Int. Cl.
*G06F 15/16* (2006.01)

(52) U.S. Cl.
USPC .......................................... 709/204; 709/215

(58) Field of Classification Search ........... 709/201–207
See application file for complete search history.

(56) References Cited

U.S. PATENT DOCUMENTS

| | | | | |
|---|---|---|---|---|
| 5,351,287 | A * | 9/1994 | Bhattacharyya et al. | 379/93.02 |
| 5,870,084 | A | 2/1999 | Kanungo et al. | |
| 6,216,159 | B1 | 4/2001 | Chintakrindi et al. | |
| 6,266,704 | B1 | 7/2001 | Reed et al. | |
| 6,397,334 | B1 * | 5/2002 | Chainer et al. | 713/176 |
| 6,538,623 | B1 * | 3/2003 | Parnian et al. | 345/8 |
| 6,745,333 | B1 * | 6/2004 | Thomsen | 726/23 |
| 6,832,262 | B2 | 12/2004 | Cromer et al. | |
| 6,907,525 | B2 | 6/2005 | Pazi et al. | |
| 6,961,850 | B1 | 11/2005 | Stebbings | |
| 7,215,833 | B1 * | 5/2007 | Tepera et al. | 382/306 |
| 7,403,115 | B2 * | 7/2008 | Yuzik | 340/540 |
| 7,496,959 | B2 * | 2/2009 | Adelstein et al. | 726/21 |
| 7,516,487 | B1 * | 4/2009 | Szeto et al. | 726/22 |
| 7,634,571 | B2 * | 12/2009 | Fertell et al. | 709/227 |
| 7,640,323 | B2 * | 12/2009 | Sun | 709/219 |
| 7,644,138 | B2 * | 1/2010 | Sun | 709/219 |

(Continued)

FOREIGN PATENT DOCUMENTS

JP 2005197901 A * 7/2005

OTHER PUBLICATIONS

Sansurooah, "Taxonomy of computer forensics methodologies and procedures for digital evidence seizure." 2006, Edith Cowan University, Australian Digital Forensics Conference.*

(Continued)

*Primary Examiner* — Patrice Winder
*Assistant Examiner* — Julian Chang
(74) *Attorney, Agent, or Firm* — Holland & Hart LLP

(57) ABSTRACT

Collecting and preserving evidence developed during an on-line investigation. Evidence gathered on-line is hashed with a time stamp from an external time source and stored. Other data pertinent to an investigation is also stored and may also be hashed. The evidence may be presented later in a report that demonstrates the authenticity of the evidence. A computer system for on-line investigations includes a CPU, memory, input/output facilities, a communication element, and a security element such as a dongle. Communication software enables the investigator to communicate over the Internet and gather evidence. Investigation software enables the computer system to store and hash the evidence; this may be done automatically. A database structure includes tables for investigator and suspect data, cases, evidence, and provision for storing a time stamp indicating when the evidence was collected.

21 Claims, 16 Drawing Sheets

U.S. PATENT DOCUMENTS

| | | | | |
|---|---|---|---|---|
| 7,685,428 | B2 * | 3/2010 | Piersol | 713/178 |
| 2002/0032770 | A1 * | 3/2002 | Fertell et al. | 709/224 |
| 2002/0068582 | A1 * | 6/2002 | Zawislak | 455/456 |
| 2002/0083024 | A1 * | 6/2002 | Myers | 705/500 |
| 2003/0182443 | A1 * | 9/2003 | Wang et al. | 709/238 |
| 2004/0213172 | A1 * | 10/2004 | Myers et al. | 370/313 |
| 2004/0243536 | A1 * | 12/2004 | Jensen et al. | 707/1 |
| 2004/0260733 | A1 * | 12/2004 | Adelstein et al. | 707/202 |
| 2005/0038794 | A1 * | 2/2005 | Piersol | 707/100 |
| 2005/0175072 | A1 | 8/2005 | Mack et al. | |
| 2006/0013096 | A1 * | 1/2006 | Holmes | 369/53.21 |
| 2006/0041508 | A1 * | 2/2006 | Pham et al. | 705/50 |
| 2006/0068755 | A1 * | 3/2006 | Shraim et al. | 455/410 |
| 2006/0123413 | A1 | 6/2006 | Collet et al. | |
| 2006/0184690 | A1 * | 8/2006 | Milliken | 709/238 |
| 2007/0063838 | A1 * | 3/2007 | Yuzik | 340/540 |
| 2007/0088736 | A1 * | 4/2007 | DeBie | 707/102 |
| 2007/0112783 | A1 * | 5/2007 | McCreight et al. | 707/10 |
| 2007/0168455 | A1 * | 7/2007 | Sun | 709/217 |
| 2007/0198275 | A1 * | 8/2007 | Malden et al. | 705/1 |
| 2007/0226170 | A1 * | 9/2007 | Sun | 707/1 |
| 2008/0034211 | A1 * | 2/2008 | Shull et al. | 713/175 |
| 2008/0065315 | A1 * | 3/2008 | Guy et al. | 701/200 |
| 2008/0086317 | A1 * | 4/2008 | Jones et al. | 705/1 |
| 2008/0091790 | A1 * | 4/2008 | Beck | 709/217 |
| 2008/0195543 | A1 * | 8/2008 | Turner | 705/50 |
| 2008/0244704 | A1 * | 10/2008 | Lotter et al. | 726/3 |
| 2009/0012826 | A1 * | 1/2009 | Eilam et al. | 705/7 |
| 2009/0070195 | A1 * | 3/2009 | Leininger et al. | 705/10 |
| 2009/0073265 | A1 * | 3/2009 | Greenhill et al. | 348/148 |
| 2009/0089361 | A1 * | 4/2009 | Womack et al. | 709/202 |
| 2009/0144102 | A1 * | 6/2009 | Lopez | 705/7 |
| 2009/0150998 | A1 * | 6/2009 | Adelstein et al. | 726/22 |
| 2009/0164427 | A1 * | 6/2009 | Shields et al. | 707/3 |
| 2009/0164517 | A1 * | 6/2009 | Shields et al. | 707/104.1 |
| 2009/0164522 | A1 * | 6/2009 | Fahey | 707/104.1 |
| 2009/0177626 | A1 * | 7/2009 | Lottero | 707/3 |
| 2009/0198651 | A1 * | 8/2009 | Shiffer et al. | 707/3 |
| 2009/0198670 | A1 * | 8/2009 | Shiffer et al. | 707/5 |
| 2009/0198689 | A1 * | 8/2009 | Frazier et al. | 707/6 |
| 2009/0288164 | A1 * | 11/2009 | Adelstein et al. | 726/22 |

OTHER PUBLICATIONS leong, "Deriving Cse-specific Live Forensics Invenstigation Procedures from FORZA" 2007, ACM, SAC'07.*

International Search Report and Written Opinion mailed on Nov. 14, 2008 for PCT Application No. PCT/US2008/074245.

* cited by examiner

Evidence Verification Options screen

609 [Case number]
611 [Case name]
813 [Investigator]

Port Traffic Recorder options ⟋801
- ☑ Record port 80/433
- ☑ Record IM/CHAT
- ☑ Record MIRC
- ☑ Record SMTP
- ☑ Record Gnutella Input:   Output:
- ☑ Record custom ports 1:
- ☑ Record custom ports 2:
- ☑ Record custom ports 3:
- ☑ Record custom ports 4:

Undercover identity masking ⟋807
- ☑ Use Privoxy    Primary host:
-                         Secondary:
- ☑ Use Onion Routing   Primary TOR:
-                         Secondary:

Video options ⟋803
- ☑ Videotape all actions
- ☑ Enable screenshot
- ☑ Enable site copy

Logging options ⟋805
- ☑ IntegraStamp
- ☑ MD5 Hash
- ☑ SHA1 Hash
- ☑ SHA256 Hash
- ☑ SHA384 Hash
- ☑ SHA512 Hash
- ☑ Key logger
- ☑ Save all actions
- ☑ Run all IP addresses
- ☑ Record ISP
- ☑ Prepare ISP letter

815 [ OK ]

817 [ Cancel ]

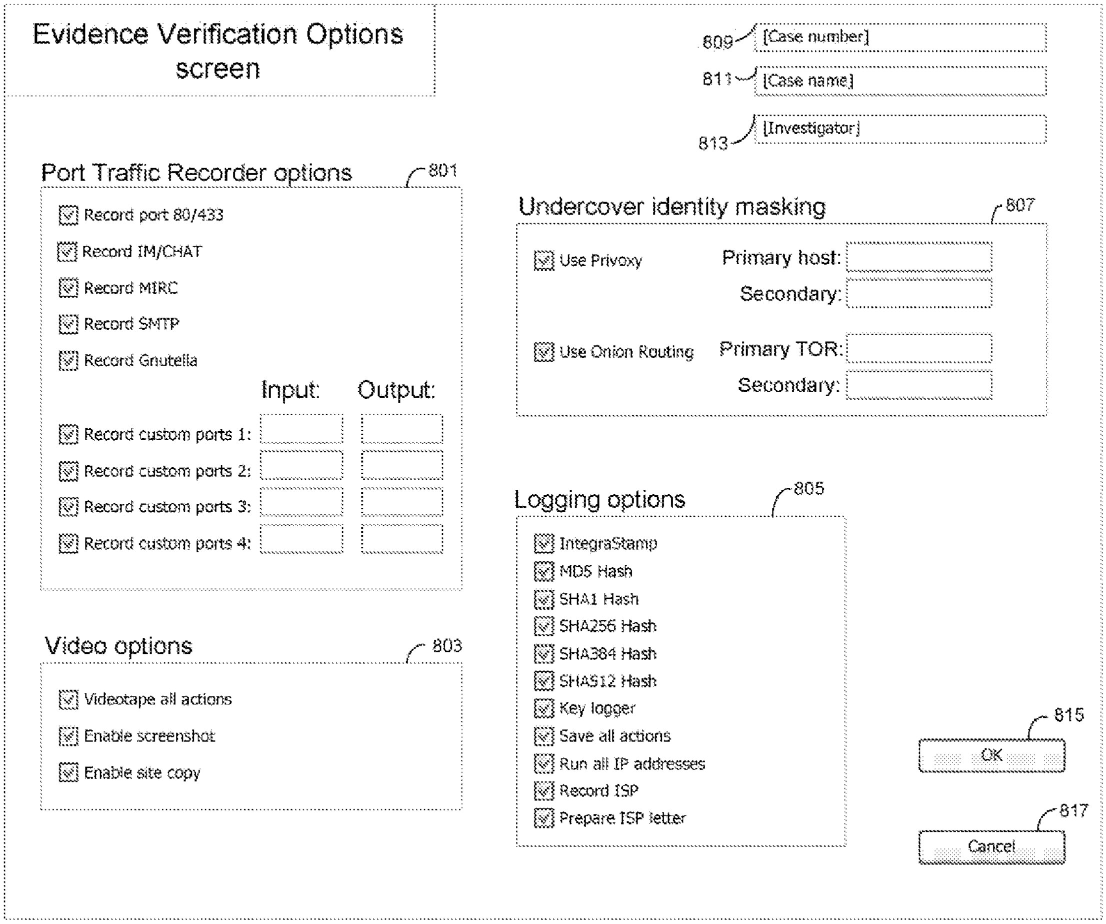

Figure 8

ONLINE EVIDENCE COLLECTION

This application claims the benefit of U.S. Provisional Patent Application Ser. No. 60/966,128, filed 25 Aug. 2007, titled "Online Evidence Collection System", the entire contents of which are incorporated herein by this reference.

BACKGROUND

Criminal investigations are often carried out wholly or in part on the Internet. This is particularly true of investigations of crimes that are themselves committed entirely or partly over the Internet, for example crimes involving exploitation of children, gambling, pornography, and various kinds of fraud and larceny. Even if the actual crime is committed using other instrumentalities, evidence of the crime often exists in electronic form, and sometimes only in electronic form.

Successful prosecution of any crime requires reliable, accurate evidence that meets various legal standards for admissibility. Gathering such evidence over the Internet presents special problems in that subject matter on the Internet is transient and easily changed. There has been a need for way to efficiently collect evidence over the Internet together with the time and date when the evidence was collected, and to preserve that evidence in a form that is provably authentic in the context of a criminal prosecution.

SUMMARY OF THE INVENTION

An embodiment of the invention provides a method of collecting and preserving evidence developed during an on-line investigation of a suspect. Evidence gathered on-line by an investigator, and other data indicative of activities performed by the investigator, are stored. A time stamp is obtained from an external source and the data and evidence are encoded with the time stamp, for example by hashing. A report is generated, presenting the evidence and other data and demonstrating their authenticity by reference to the time stamp. These steps may be carried out automatically by a computer system while the investigator is gathering the evidence.

An identity mask may be implemented to prevent the suspect from detecting an internet protocol address of a computer being used by the investigator. The investigator may use an undercover identity. Internet protocol addresses accessed by the investigator may be checked for authenticity and stored along with information respecting any internet protocol address found not to be authentic. A physical security device such as a dongle may be used to control access to the encoded data.

A computerized evidence collection and authentication system according to an embodiment of the invention includes a central processing unit, memory, an input terminal, an output terminal, a communication element, and a security element. The system also includes communication software responsive to commands from an investigator to cause the computer to communicate electronically with a remotely located computer, in some embodiments without revealing the investigator's identity, and investigation software operative to cause the computer to store any data obtained from the remotely located computer by the investigator, obtain a time stamp from a remotely located time source, and encode the data with the time stamp. The investigation software may function automatically while the investigator is gathering evidence.

A database structure according to an embodiment of the invention includes a table for data descriptive of investigators including undercover identities and handles, a table for suspect data including suspect handles, a table for data about cases, a table for evidence collected on-line by an investigator, and a time stamp indicative of a time when the evidence was collected. The evidence table may include the evidence and time stamp in hashed form. Other tables may include categorized data respecting undercover identities and suspects, and suspect-case and investigator-case cross-references.

Further aspects of the invention will become apparent from the drawings and the following description, illustrating by example the principles of the invention.

BRIEF DESCRIPTION OF THE DRAWINGS

FIG. 8 depicts an evidence verification options screen of an embodiment of the invention.

DESCRIPTION OF THE EMBODIMENTS

Figure 1:
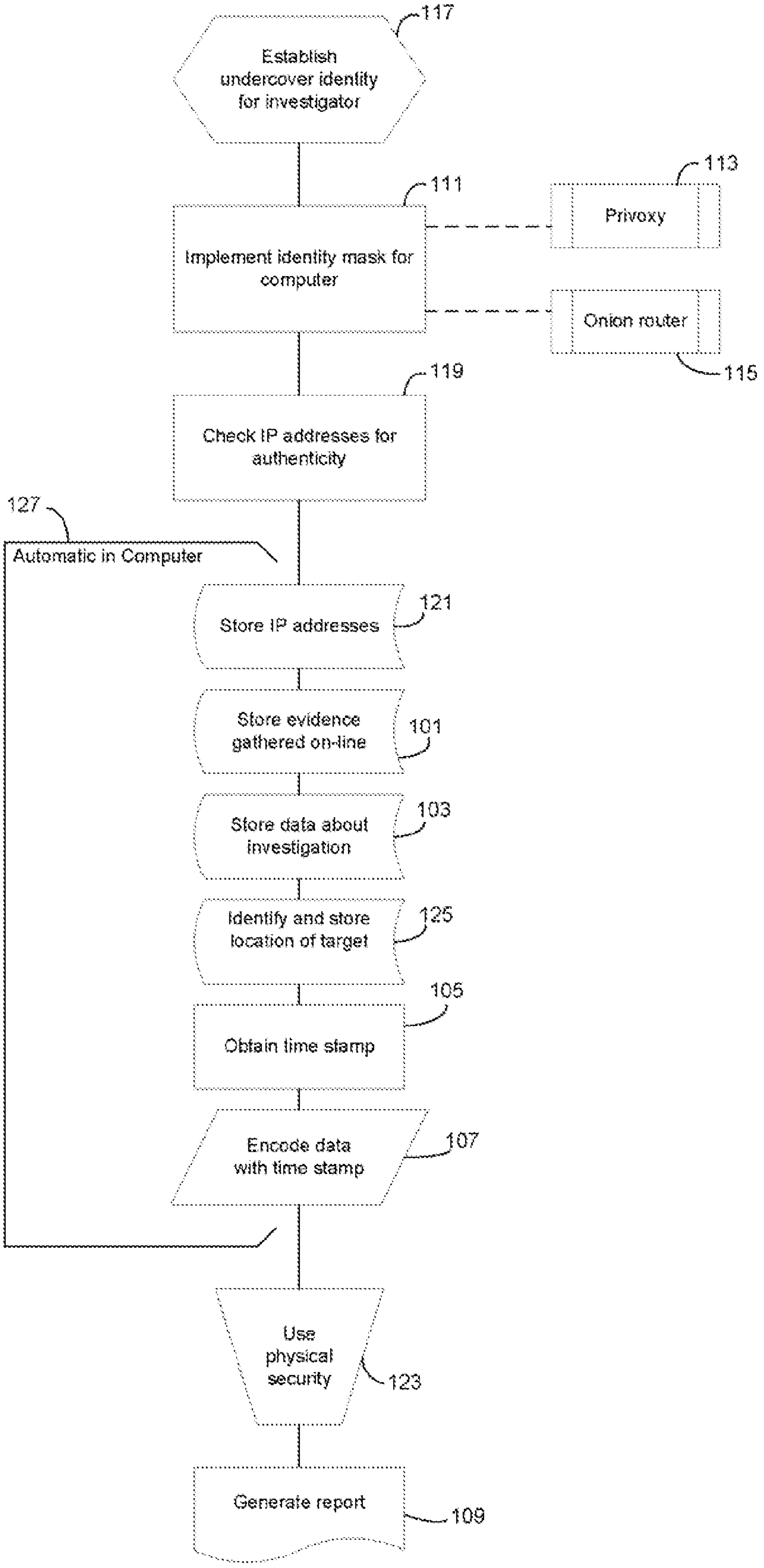
FIG. 1 is a flowchart of a method of collecting evidence embodying the invention.

A method of collecting and preserving evidence developed during an on-line investigation of a suspect according to principles of the invention is shown in FIG. 1. Evidence gathered on-line by an investigator while investigating the suspect is stored (101). Data indicative of activities performed by the investigator in the course of gathering the evidence is also stored (103). Such data in some embodiments includes keystroke logging of each keystroke of the investigator. A time stamp is obtained from an external source (105), for example an Internet site such as that of the United States National Institute of Standards and Technology which is known to be accurate and reliable. The data and evidence are encoded with the time stamp (107). A report is generated (109) setting forth the evidence and data and demonstrating the authenticity of the evidence by reference to the time stamp. The report may be printed in hard-copy form or it may be stored in a database or on a medium such as a CD or a DVD.

An identity mask may be implemented (111) to prevent the suspect from detecting an internet protocol address of a computer being used by the investigator. In some investigations this step may be omitted. Implementing the identity mask may include using a privoxy system (113) or transmitting a message to the suspect through an unpredictable network of computers (115) for example by onion routing.

An undercover identity may be established for the investigator (117). This may be the first step in commencing an investigation, or it may be omitted if deemed unnecessary or if time does not permit performing it. Internet protocol addresses accessed by the investigator may be check for authenticity (119), and stored (121) together with information respecting any internet protocol address found not to be authentic.

A physical security device, for example a dongle, may be used to control access to the encoded data (123).

A physical location of a computer system being used by the suspect may be stored (125) and that identification may be included along with other data when encoding the data.

Storing evidence and other data, obtaining a time stamp, and encoding may be performed automatically (127) in a computer system being used by the investigator. Encoding the data may comprise hashing, a mathematical algorithm that generates a unique identification key which can be used to verify whether the hashed data has been altered. Hashing may be accomplished by such hashing functions as MD5, SHA1, SHA256, SHA304, SHA 512, or other suitable means. The hash function returns the identification key, sometimes referred to as a digital fingerprint or a message digest, as output. This identification key can be used with the original evidence file to prove that the evidence file was created at a specific time on a specific date and has not been altered.

As noted above, implementing an identity mask may be accomplished by privoxy (113), a procedure that prevents a target of the investigation from discovering the IP address of the investigator, although the target can identify the proxy server being used by the investigator. Or this may be done by onion routing (115), a procedure that sends messages from the investigator through an unpredictable series of proxy ("onion") routers. Optionally, if the investigator chooses onion routing, a prompt reminds the investigator that a sophisticated target may be put on guard by use of such a procedure.

Separate records may be kept of information passing between the investigator and each of a plurality of targets.

Data indicative of activities performed by the investigator may include more than the actual evidence being gathered by the investigator. For example, such data may include a record of web pages accessed by the investigator, messages between the investigator and the target, files shared by the investigator, or other such materials. Even though some of the data may not actually comprise admissible evidence, it may be useful for other purposes related to the investigation.

IP addresses are checked during the investigator's on-line activity. If an address is determined to be valid, the address is captured and the relevant ISP is looked up. A letter may be prepared to send to the ISP requesting assistance in preserving evidence. If the IP address is determined to be spoofed, the proxy address is captured, the host is identified and letters may be prepared to send to the host. New IP address information may be published to the Shared Knowledge Base of IPs Under Investigation.

Figure 2:
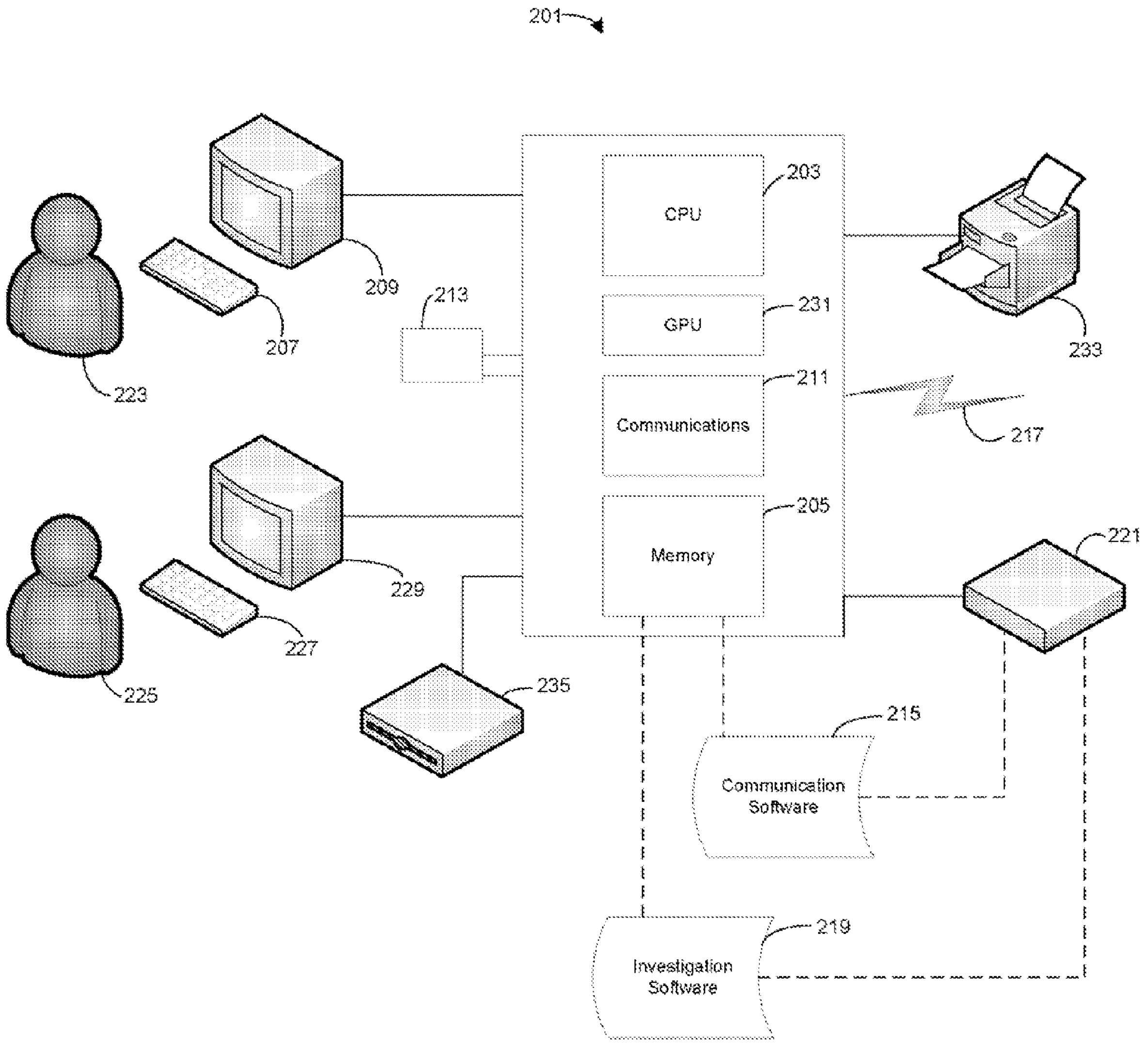
FIG. 2 is a block diagram of a computerized evidence collection and authentication system embodying the invention.

FIG. 2 depicts a computerized evidence collection and authentication system according to an embodiment of the invention. The system includes a computer 201 with a central processing unit 203, memory 205, an input terminal 207, an output terminal 209, a communication element 211, and a security element 213. The system includes communication software 215 responsive to commands from an investigator to cause the computer to communicate electronically 217 with a remotely located computer without revealing the investigator's identity. Investigation software 217 causes the computer to store any data obtained from the remotely located computer by the investigator, obtain a time stamp from a remotely located time source, and encode the data with the time stamp. The data may be stored in the memory 205, on a medium such as a hard disk 221, or some other suitable storage device.

For convenience the investigation software 219 and the communication software 215 are shown as separate entities. These functions may instead be performed by a single integrated software package.

The investigation software may be under control of an investigator such as the user 223, or the investigation software may function automatically to be sure the investigator does not miss anything and to relieve the investigator of the need to handle such chores.

The system may be adapted for use by a plurality of investigators such as the user 225 who also has an input terminal 227 and an output terminal 229. Additional terminals may be provided for additional users, at the same physical location or remotely, as desired.

The central processing unit 203 may include graphics capability, or for better and faster graphical presentation of investigations in progress a separate graphs processor unit 231 may be employed.

The communication software 215 may verify, automatically or under investigator control, authenticity of any internet protocol addresses used by the investigator. The investigation software 219 may store any internet protocol addresses used by the investigator together with all available information respecting any internet protocol address found not to be authentic.

The investigation software 219 responds to commands from the investigator to generate a report that sets forth the data and demonstrates the authenticity of the data with reference to the time stamp. The report may be provided in hard copy form, for example by a printer 233, or it may be encoded on an unalterable medium such as a CD or DVD by an optical disk writer 235.

Embodiments such as those described above enable an investigator to save data gathered over the Internet in an evidentiary format. The investigator can collect information while connected to the Internet, store the evidence in an evidentiary format including a reliable timestamp to make it admissible in a court of law or useful in business applications such as human resources inquiries. Such evidence can be strong proof of what was done on-line.

Data may be gathered automatically (invisibly to the investigator) while the investigator engages with a suspect over the Internet. After being gathered, the data may be saved in a proprietary format and may be cryptographically hashed to assure a court that nothing in the data has changed since it was originally gathered.

Access to data gathered during an investigation may secured by software or by a physical security device such as a dongle. A dongle, also known as a hardware key, security device, or security token, is a physical electronic device that connects to a computer, sometimes by plugging into a port such as a printer port, to authenticate software or to authenticate a user. Data may also be secured by passwords, keycards which require personal identification numbers, and other means.

If more than one agency uses the same system, then one agency with appropriate security clearance can view evidence collected by other agencies, for example by peer to peer networking. Gnutella or another open source peer-to-peer system may be used. Connectivity of the database may be open such that it can be integrated into higher-end applications. The database may be compatible with other law enforcement data systems, for example the Global Justice Extensible Markup Language (XML) Data Model (Global JXDM) of the United States Department of Justice.

Some embodiments employ a database structure having a table structured to contain data descriptive of a plurality of investigators including undercover identities and investigator handles, a table structured to contain data descriptive of a plurality of suspects including suspect handles, a table structured to contain data descriptive of a plurality of investigative cases, a cross-reference between suspects and cases, a cross-reference between investigators and cases, and a table structured to contain evidence collected on-line by an investigator.

In some embodiments system tables may include an "applications in use" table that lists available application programs; a "log" table containing a log of all activity in the system such as logins, logouts, collection, publishing, new cases, new identities, new suspects, deletions and the like; and a "system defaults" table listing environmental defaults, file paths, version numbers, license information and the like.

A suspect information file set may include a "suspect" table, a "suspect cohort" table, and "suspect information" table, each of which may use a suspect's handle as a key. An undercover identity information file set may include such tables as an "investigator" table, an "identity file" table, an "identity pet" table, an "identity family" table, and an "identity cohort" table. These tables key on an investigator identification number and may provide an identity handle, an identity pet handle, an identity family handle, and an identity cohort handle, respectively.

Threads may be created to track and manage chains of collected evidence in an "evidence thread" table that keys on a case number.

A "case file" table keys on the case number and includes identity handles, suspect handles, and investigator identifications. This table can track and manage all case-specific details. An "investigator" table keys on investigator identification and contains information about the investigators.

A case specific suspect information file set includes a "case suspect" table containing "suspect case numbers" and "suspect handles", a "case suspect cohort" table containing "suspect cohort case numbers" and "suspect cohort handles", a "case suspect contact log" table containing "suspect contact case numbers" and "suspect contact handles", and a "case suspect information" table containing "suspect information case numbers" and "suspect information handles". A "case suspect IP address" table contains "suspect IP case numbers" and "suspect IP handles".

An undercover identity information file set includes a "case identity" table containing "identity case numbers" and "identity handles", a "case identity pet" table containing "identity pet case numbers" and "identity pet handles", a "case identity family" table containing "identity family case numbers" and "identity family handles", and a "case identity cohort" table containing "identity cohort case numbers" and "identity cohort handles". Investigators may modify the information in these files as needed for a specific case.

Template letters to be sent to Internet Service Providers ("ISPs") to request preservation of logs and other evidence may be stored in a "template letter" table and keyed on a "letter type" identifier. A "sent letter" table contains "letter type" and "case number" information.

One or more "wizards" may be provided to assist an investigator with such tasks as collecting information and developing identities for use on-line.

Figure 3:
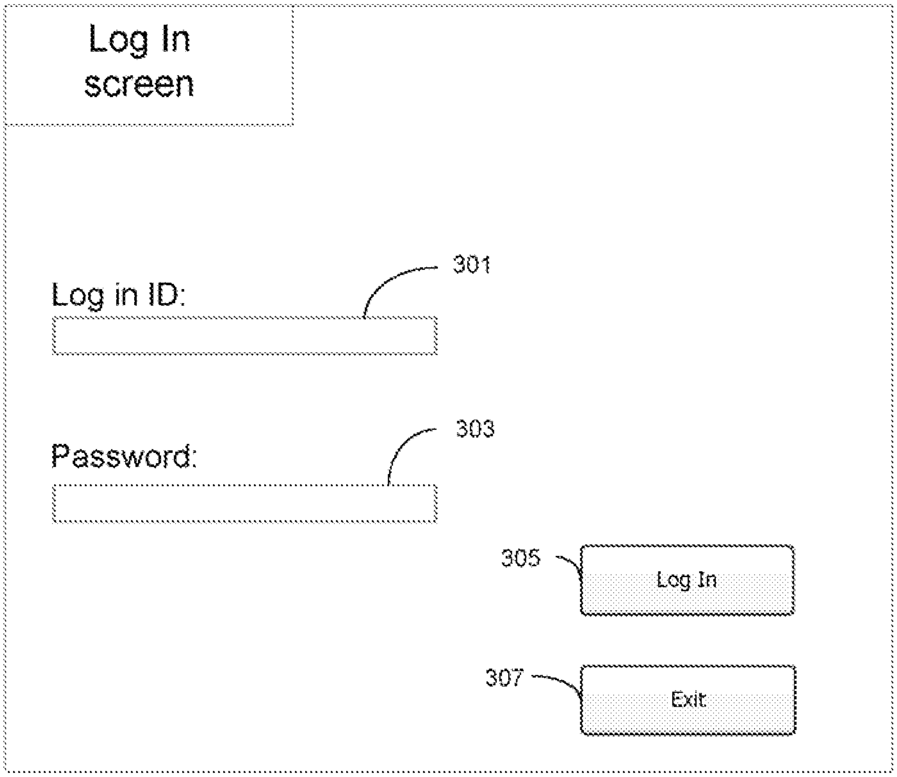
FIG. 3 depicts a log-in screen of an embodiment of the invention.

Exemplary computer screens that may be utilized in implementing embodiments of the invention will now be described. A typical embodiment may be used by a plurality of investigators who can log in by means of a log-in screen such as that shown in FIG. 3. The investigator enters a log-in ID in a text box 301 and a password in a text box 303 and then operates a log-in button 305. An exit button 307 is also provided.

Figure 4:
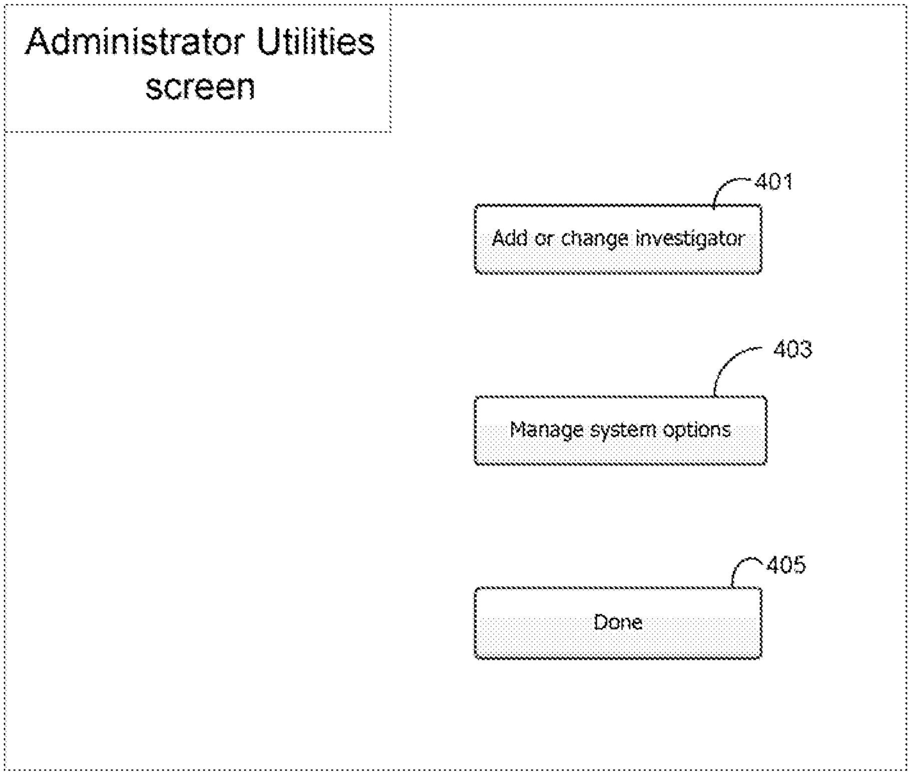
FIG. 4 depicts an administrator utilities screen of an embodiment of the invention.

As shown in FIG. 4, an administrator, who may also be an investigator, performs administrative functions such as adding or changing an investigator (button 401) or managing other system options (button 403). When finished, a button 405 may be operated to end the administrative session.

When a specific person logs in as an investigator, he or she is only allowed to see a portion of the available information in the database. For example, one investigator is not permitted to view investigations of other investigators unless allowed by the administrator.

Figure 5:
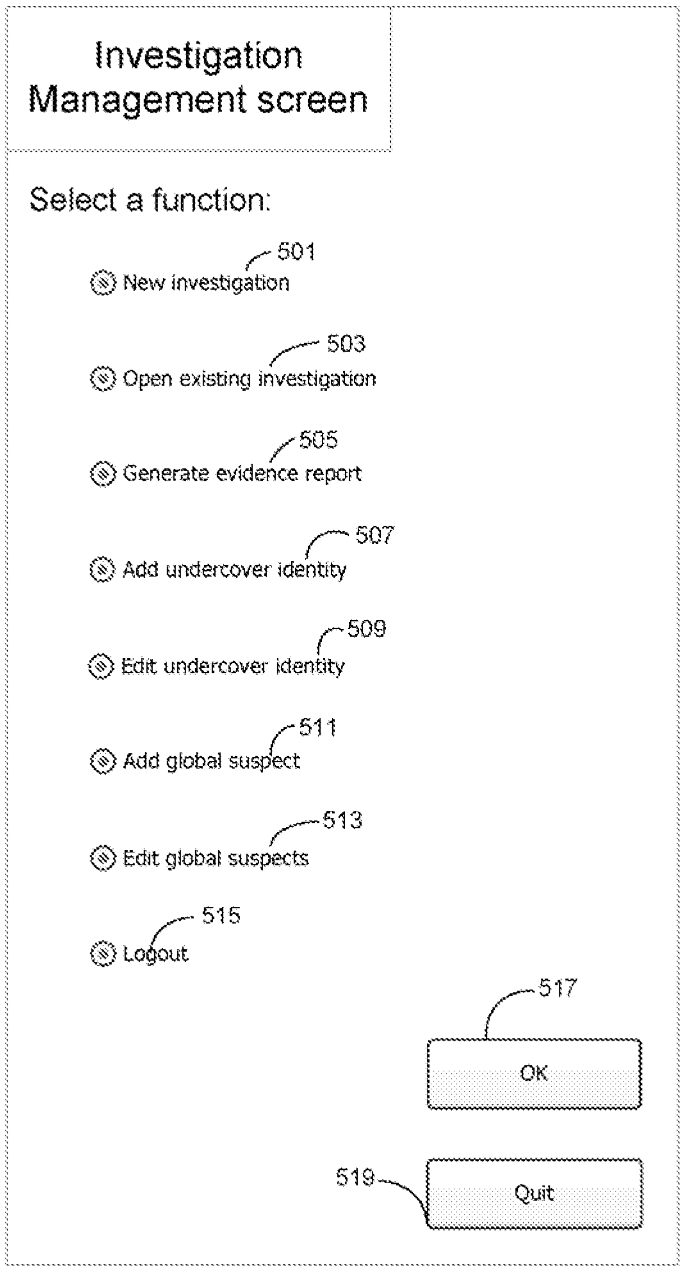
FIG. 5 depicts a menu screen of an embodiment of the invention.

Various functions can be initiated by an investigator from a menu screen as shown in FIG. 5. These may include starting a new investigation 501, opening an existing investigation 503, generating an evidence report 505, adding an undercover identity 507, editing an undercover identity 509, adding a global suspect 511, editing global suspects 513, and logout 515. An OK button 517 and a Quit button 519 are used as appropriate.

Figure 6:
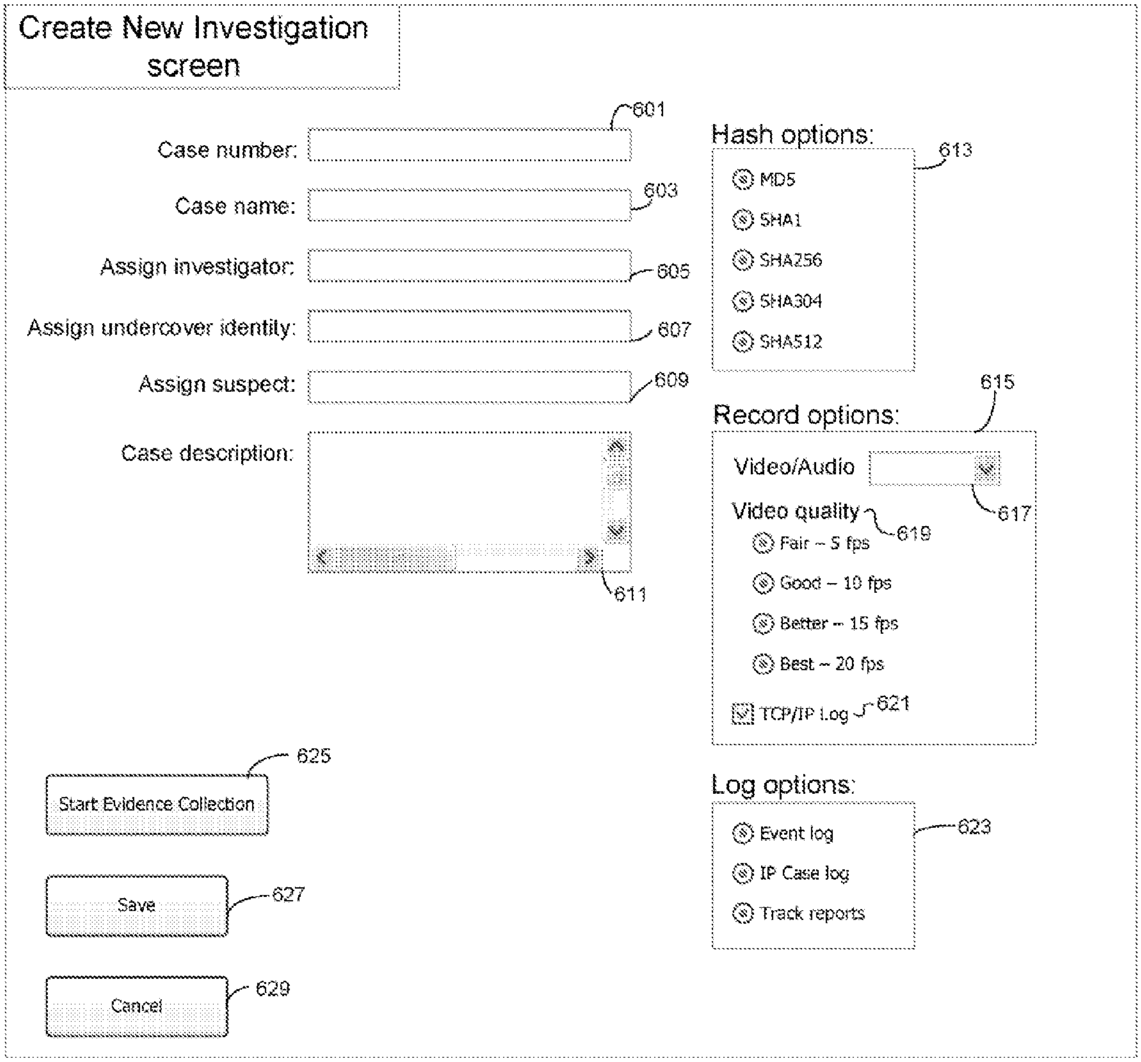
FIG. 6 depicts a "create new investigation" screen of an embodiment of the invention.

If a new case is to be started, the investigator may be taken to a screen such as the "create new investigation" screen shown in FIG. 6. A case number 601 is automatically assigned by the system. A case name 603 may be assigned automatically or entered by the investigator. An investigator may be assigned 605 by selection from a pulldown list or an identifier may be entered manually. An undercover identity 607 and a suspect 609 may optionally be assigned, and a case description 611 may be entered. The investigator may select a hash option 613; recording options 615 such as video or audio recording 617, video quality 619, and TCP/IP logging 621; and other log options 623. "Start Evidence Collection" 625, "Save" 627, and "Cancel" 629 buttons may be used as appropriate.

Figure 7:
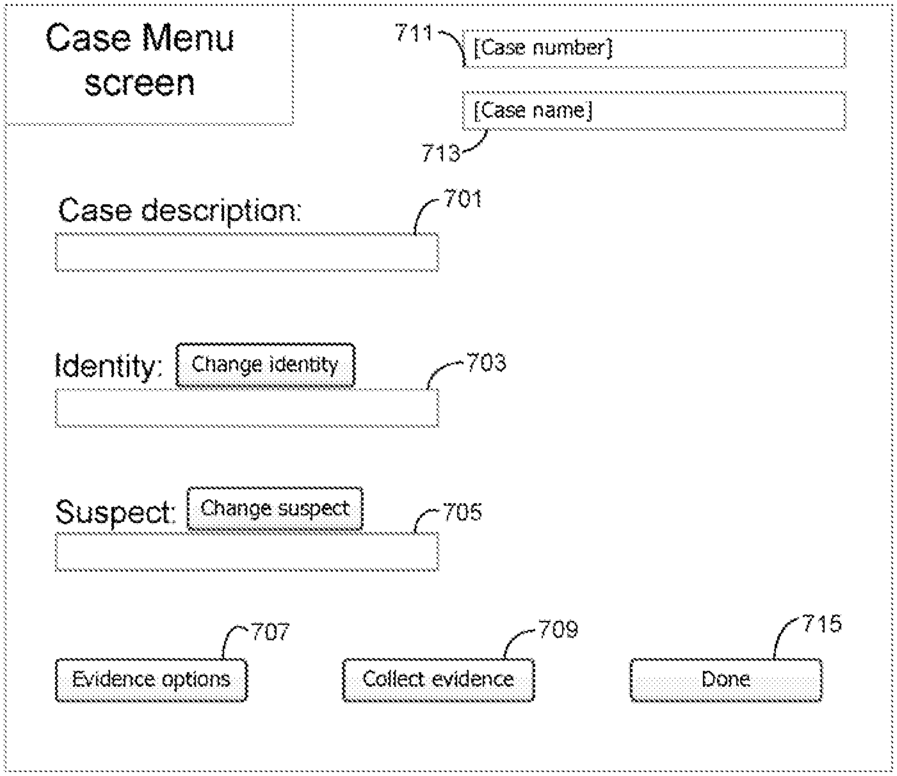
FIG. 7 depicts a case menu screen of an embodiment of the invention.

When an investigator is working with an existing case, a "case menu" screen as shown in FIG. 7 gives the investigator other choices including updating the case description 701, changing identity of investigator 703 or suspect 705, accessing evidence options 707, and proceeding with evidence collection 709. The case is identified by displaying the case name 711 and case number 713. A "done" button 715 may be used when desired.

Evidence options, when selected by the button 707, are depicted in an "evidence verification options" screen as shown in FIG. 8. These options give the investigator options on how evidence is to be recorded, and how much evidence is to be recorded. The investigator may select various port traffic recorder options 801, video options 803, logging options 805, and undercover masking options 807. The case is identified by displaying the case name 809, case number 811 and investigator 813. An "OK" button 813 and a "cancel" button 815 may be used when desired.

Undercover masking options 807 give the investigator the option to mask the identity of the computer that is being used—undercover address obfuscation. Two such options, as briefly discussed above, are privoxy and onion routing. Other identity masking options (not listed) could also be used. When an investigator is using privoxy, for example while conversing with a suspect in a chat room, the suspect can discover the proxy server the investigator's computer is using, but cannot see beyond that to the actual IP address of the investigator. If the investigator chooses onion routing, the suspect cannot trace the route of a message from the investigator or "ping" the investigator's computer. Onion routing works by sending messages from the investigator through an unpredictable series of proxy ("onion") routers. When a high level of address obfuscation such as onion routing is used, the system may remind the investigator that this tactic may alert the suspect that something other than a normal conversation is taking place.

Logging options 805 include various hashing functions including MD5, SHA1, SHA256, SHA384, and SHA 512. Other hashing functions or other methods of authenticating the evidence may also be included as desired.

Logging options 805 include "key logger" to store all or nearly all keystrokes on the keyboard, "save all action" to log all system functions, "run all IP addresses" to automatically locate information respecting IP addresses (such as "who-is" functions), "record ISP provider" to automatically provide information about ISPs for websites visited on this evidence gathering session, and "prepare ISP letter" to automatically provide a form letter requesting that an ISP preserve evidence for websites visited on this evidence gathering session. Such a letter may include the name and address of the ISP and an information listing, for example the proxy log for a specific time.

Port traffic recorder options 801 provide options to log Internet traffic and to specify which kinds of traffic to log. "Record port 80/443" includes http (80) and https (443) and records most web browsing traffic. "Record IM/Chat" searches a range of ports to find where chat traffic is occurring. "Record MIRC" records internet relay chat through MIRC (an Internet relay chat program). "Record SMTP" records email transmissions ("SMTP" is "Simple Mail Transfer Protocol"). "Record Gnutella" records traffic from file-sharing networks such as FastTrack, LimeWire, KaZaa and Napster. Custom port recording, including input and outputs may also be specified.

Video options 803 include "videotape all actions" to record the site as if a video of the website were being taken; "enable screenshot" to take screen capture pictures when the investigator chooses to do so, and "enable site copy" to record the whole website such that a copy of the website may be reproduced at a later date.

Figure 9:
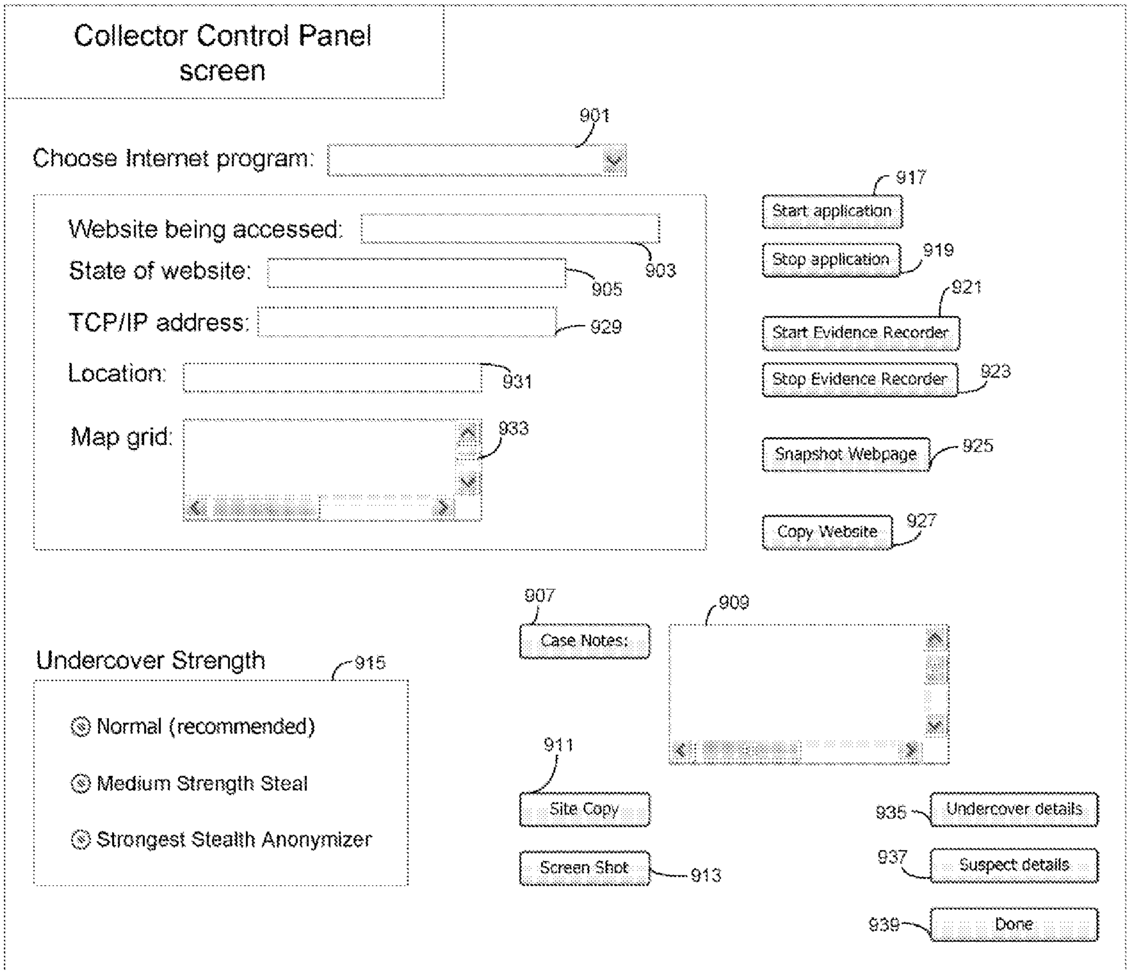
FIG. 9 depicts a "collector control panel" screen of an embodiment of the invention.

A "collector control panel" screen, shown in FIG. 9, may be displayed during the time an investigator is gathering evidence. This screen may actually be arranged in a compact column along one side of the visual display, or in a "ruler" along the top or bottom of the display, or in some other unobtrusive arrangement as may be convenient to present the information without cluttering the overall visual display. It may be minimized if desired.

A dropdown box 901 allows the investigator to select an Internet access program such as Explorer, Limewire, Safari, Firefox, AOL Instant Messaging, or the like, to be opened and recorded while the investigator is using it. The administrator may determine which programs will appear in the box. The website being accessed is indicated in a box 903 and the state of that website is displayed in a box 905. The state of the website may indicate if the website address is being spoofed itself (that is, if the actual IP address is being hidden) or if there are other known problems with the website, such as if it is a known dangerous site. Outside agencies may be accessed to determine the most up-to-date information about such website status.

The investigator may choose a "case notes" button 907 to activate a window 909 in which the investigator may make notes. "Site copy" and "screen shot" buttons 911 and 913, respectively, are similar to functions of the same name in the "video options" section 803 of FIG. 8.

An "undercover strength" section 915 provides the investigator with control of whether and how the investigator's IP address is hidden. "Normal" may indicate no hiding, "medium" may select an address hiding function such as privoxy, and "strongest" may select a hiding function such as onion routing.

A "start application" button 917 begins the application selected in the dropbox 901, and a "stop application" button 919 stops it. A "start evidence recorder" button 921 starts recording keyboard activity to whatever level was selected in the various options shown in FIG. 8, and a "stop evidence recorder" button 923 stops the recording. Other visual indications, for example icons that mimic a VCR control set, may be used instead of the buttons. While recording is taking place, the investigator may be investigating, chatting, or the like. The times are recorded using an external time source, rather than an internal computer clock, as discussed previously. A "snapshot web page" button 925 and a "copy website" button 927 may be used to perform the respective functions as desired.

The actual IP address of the site being accessed (if known) is indicated in a box 929, and a physical location of the corresponding server is indicated in a box 931. A "map grid" display 933 shows the location on a map.

An "undercover details" button 935 may be used to invoke a screen that gives details about the undercover identity being used by the investigator. The details of an undercover identity may vary widely from one investigation to another and may include without limitation such items as full name, physical description, contact details, personality description, occupation, driver license number, description of car, credit card, family status, hobbies, musical taste, and favorites such as favorite actor, book, sport, food, pet or the like.

A "suspect details" button 937 may be used to invoke a screen that gives details about the suspect being targeted by the investigator. These details may include some or all of the same kinds of information as pertain to the undercover identity assumed by the investigator.

A button 939 may be used to close the collector control panel screen.

Figure 10:
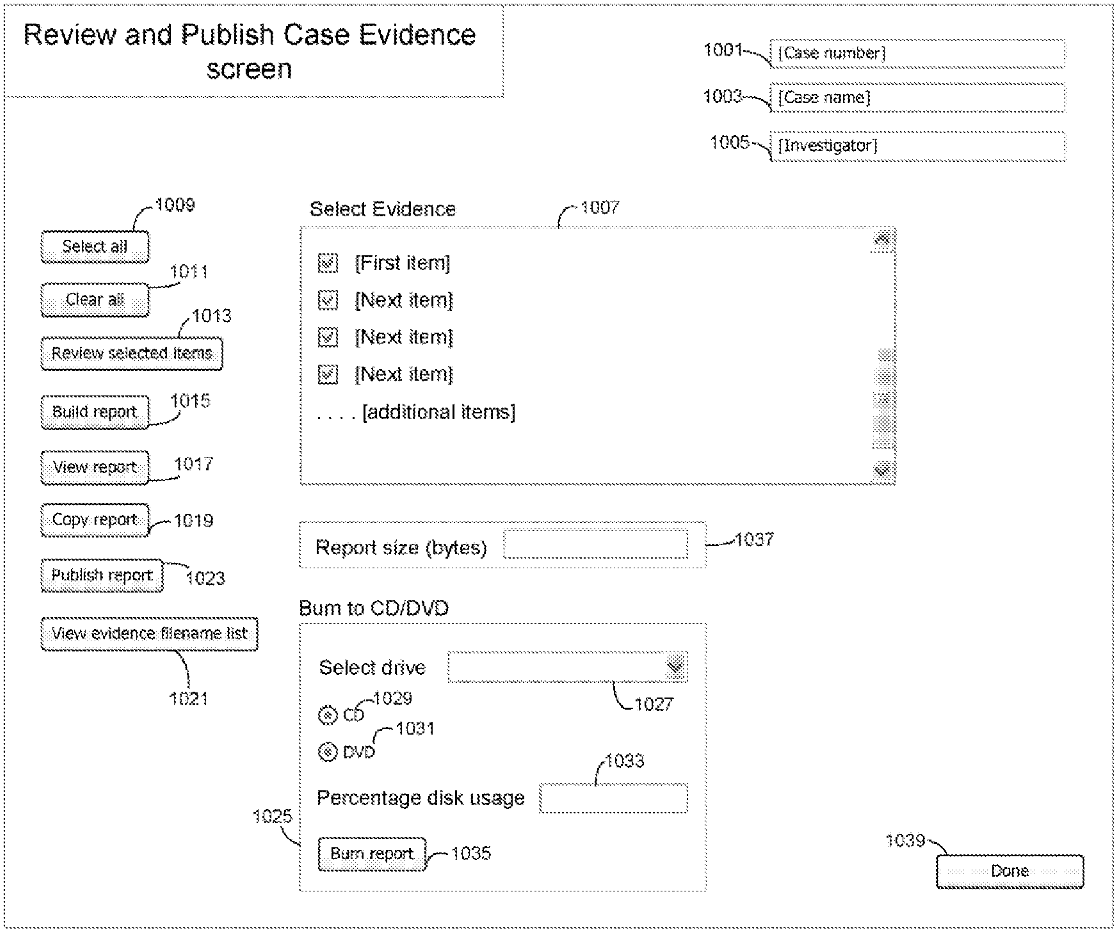
FIG. 10 depicts a "review and publish case evidence" screen of an embodiment of the invention.

A "review and publish case evidence" screen is depicted in FIG. 10. The case number, case name and investigator are identified in windows 1001, 1003 and 1005. A "select evidence" screen 1007 displays a list of recorded evidence, notes, and the like gathered by the investigator. These items may be selected individually by check marks or selected or deselected all together by a "select all" button 1009 and a "clear all" button 1011. Selected items may be called up for review by a "review selected items" button 1013. The investigator may build, view or copy a report containing selected evidence by means of a "build report" button 1015, a "view report" button 1017, and a "copy report" button 1019, respectively. A "view evidence filename list" button 1021 may be used to view a list of filenames.

The actual report may be in Hyper-Text Markup Language ("HTML") format containing links to actual items of evidence, each link linking to an appropriate program to display the item of evidence. If one of the items of evidence is a website, the report will give a hot link to a copy of the website. If one of the items comprises text written in a specific word processing program, the report will give a hotlink to launch the appropriate program and display the document. If one of the items is a video stream, the report will give a link that launches a video player and plays the video stream. If desired, the report may be prepared in other formats in addition to, or instead of, HTML. For example, the report may be published in PDF format. It may also be prepared as an image file (RAW or .ed1) for use by a digital forensic investigator.

A "publish report" button 1023 causes the report to be written in permanent form. For example, it may be sent to a printer if a hard copy (paper) printout is desired. Or it may be "burned" onto a recordable medium such as a CD, a DVD, or the like as selected in a "burn to CD/DVD" window 1025. This window 1025 includes a disk drive selection list 1027, a choice of CD 1029 or DVD 1031. The percentage of disk usage of the selected medium is displayed in a window 1031.

The overall size of the report in bytes is displayed in a window 1037.

A description of whatever hash function was used to encode the evidence may be included in the report so that the evidence may be authenticated. When finished, a "done" button 1039 may be used to end the review of evidence.

Figure 11:
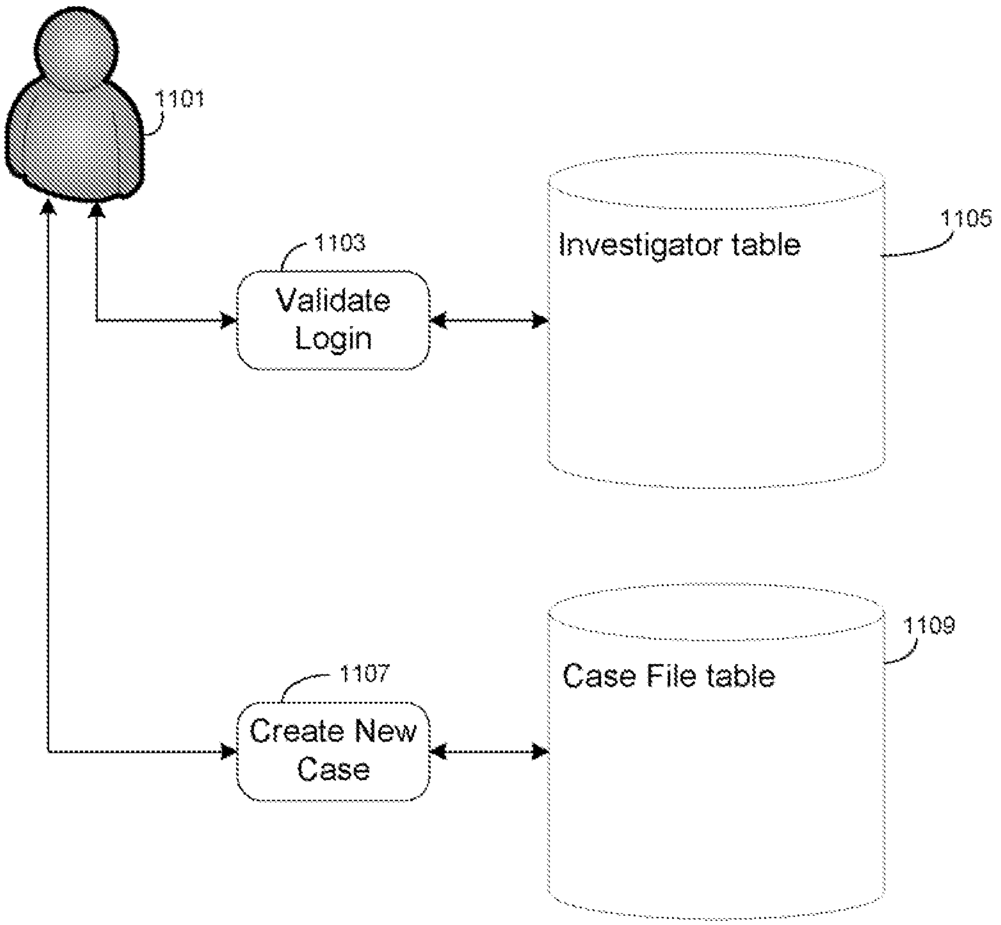
FIG. 11 depicts a database configuration of an initial log-in function according to an embodiment of the invention.

FIG. 11 depicts a database configuration and data flow respecting an initial log-in event. A user (1101) who may be either an investigator or an administrator requests (1103) to log in. This is validated by means of an investigator table (1105). An investigator ID is automatically generated if the user is a new investigator. A likely next step is a request to create a new case (1107), at which point a case file table (1109) is accessed. The case number is the case file table key. A new case number is generated automatically. Each case has an associated investigator identification.

Figure 12:
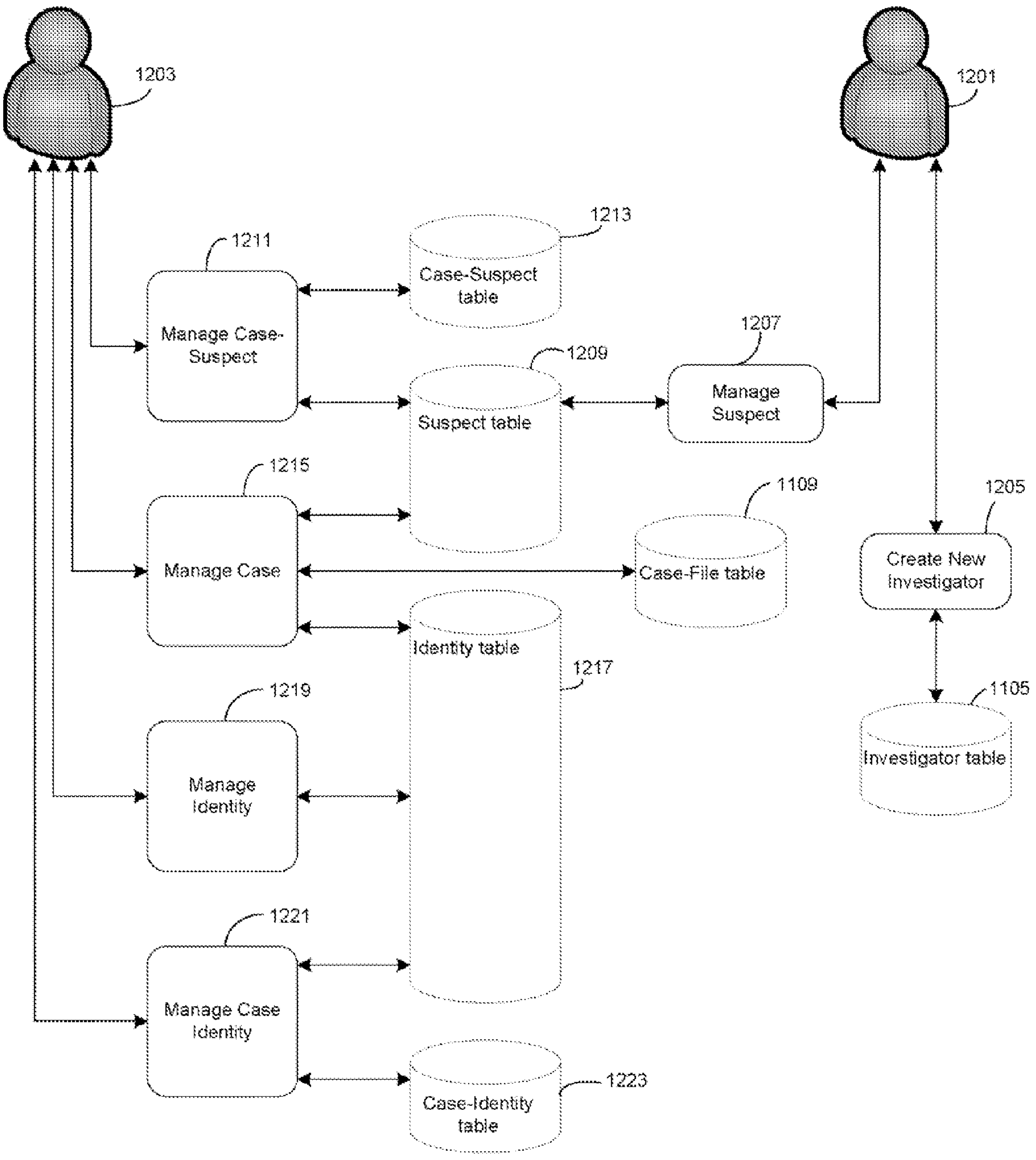
FIG. 12 depicts a database configuration of administrator and investigator management functions according to an embodiment of the invention.

FIG. 12 depicts a database configuration and data flow respecting administrator (1201) and investigator (1203) management functions. The administrator may create a new investigator (1205) by accessing the investigator table (1105). The administrator may also manage a suspect (1207) by accessing a suspect table (1209) in which the key is the suspect handle.

The investigator 1203 may manage a case-suspect (1211) which involves accessing both the suspect table and a case-suspect table (1213). The case-suspect table is created by combining a case number with a suspect handle.

The investigator may manage a case (1215) which involves accessing three tables: the suspect table, the case-file table (1109), and an identity table (1217). The identity table ("identity" refers to undercover identities) creates an identity key by combining an investigator identification and an identity handle. The investigator may manage identities (1219) by accessing the identity table. The investigator may also manage case identities (1221) by accessing a case identity table (1223) which is created by combining case number with identity handle.

Figure 13:
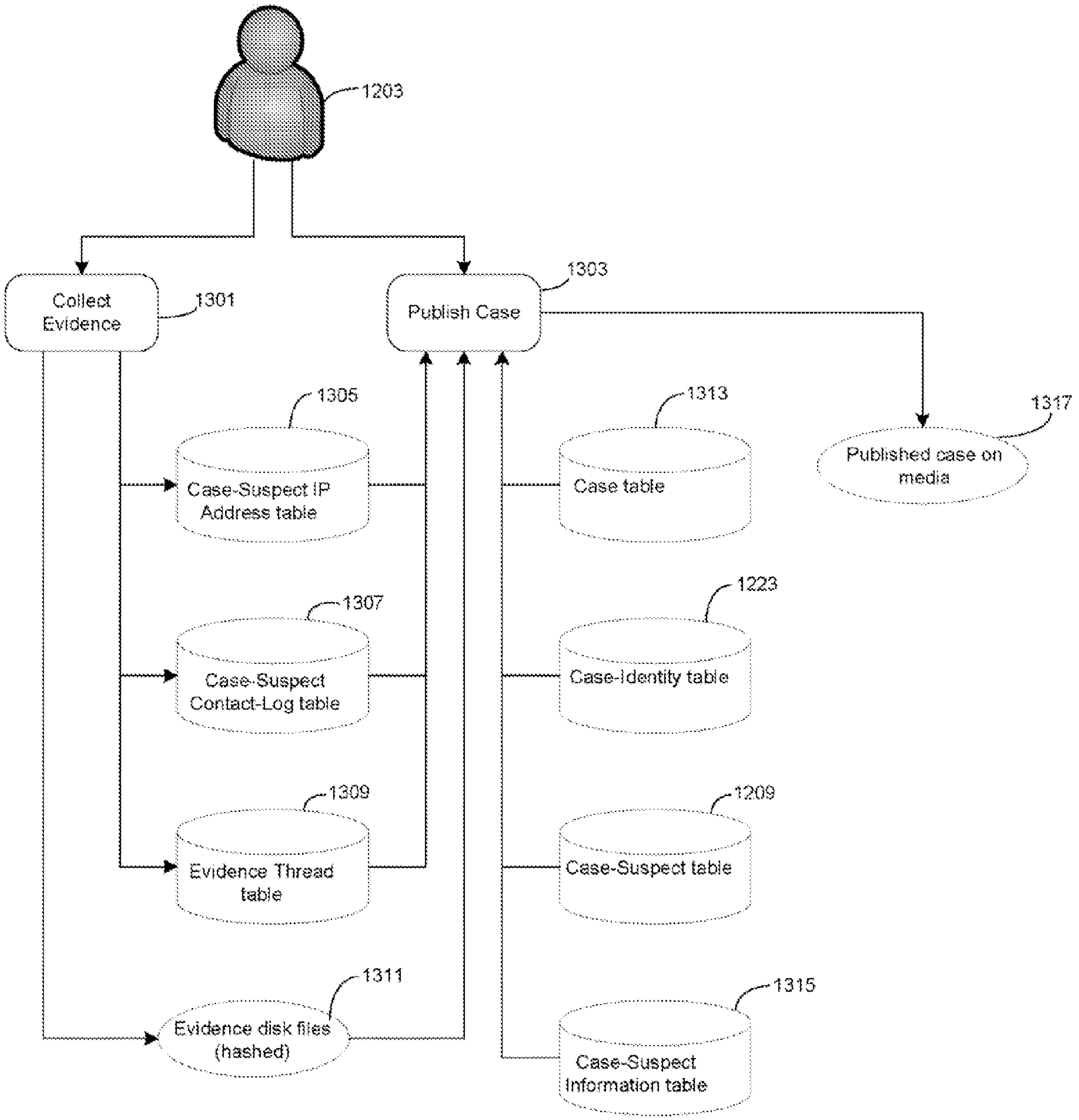
FIG. 13 depicts a database configuration of use and publication of evidence according to an embodiment of the invention.

FIG. 13 depicts a database configuration and data flow respecting use and publication of evidence. The investigator (1203) may collects evidence (1301) and publish a case (1303). Collecting evidence involves a case-suspect IP address table (1305) which keys on case number, suspect handle and date and time; a case-suspect contact-log table (1307) in which a key is created by combining case number, suspect handle and date and time; and an evidence thread table (1309) which keys on case number and thread number. The thread number is created automatically. As a result of evidence collection, evidence disk files are created (1311) by hashing as discussed previously.

Publishing a case may involve accessing all of the foregoing sources, and the case-identity table (1223), the case-suspect table (1209), a case table (1313) which keys on the automatically-generated case number, and a case-suspect information table (1315) which keys on case number, suspect handle and date and time. The end result is a published case (1317), for example on media such as a DVD or CD.

Figure 14:
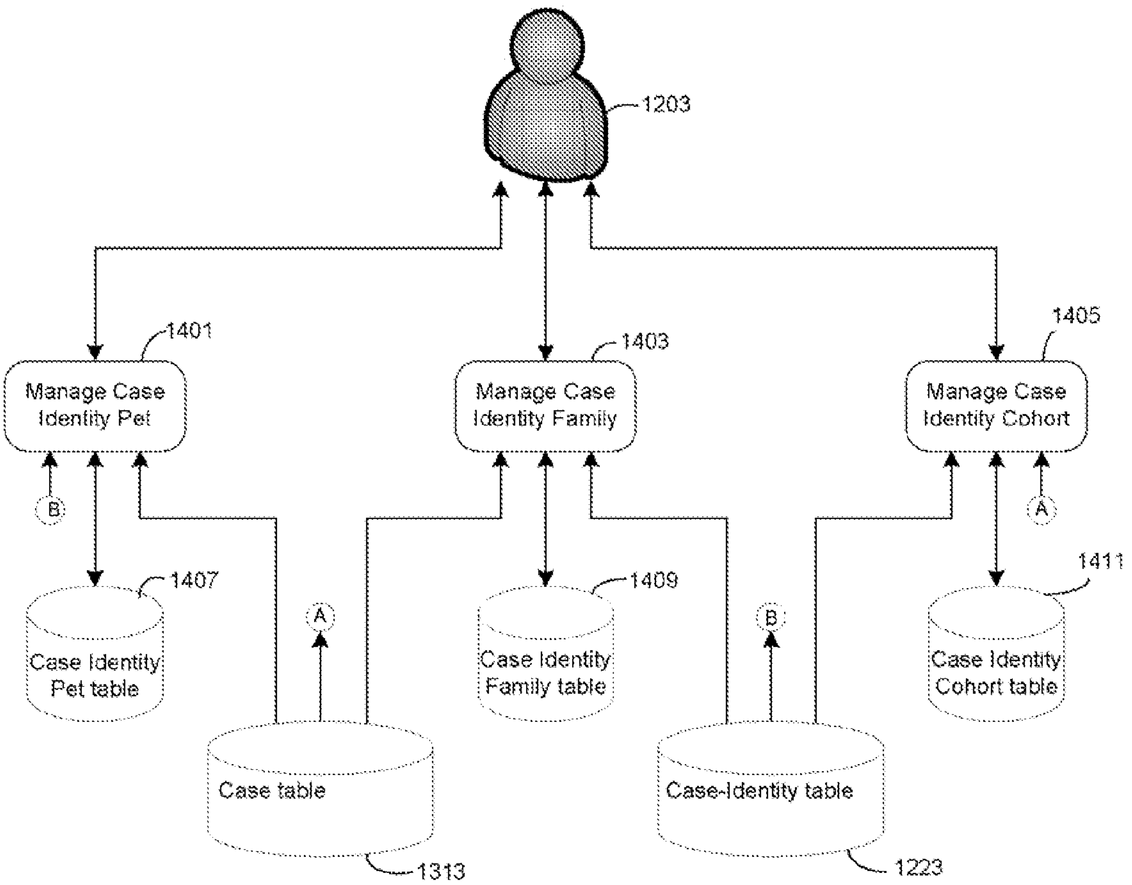
FIG. 14 depicts a database configuration of undercover identity management according to an embodiment of the invention.

FIG. 14 depicts a database configuration and data flow for undercover identity management including various categories of characteristics of an undercover identity. By way of example, the investigator (1203) may manage a case identity pet (1401), a case identity family (1403) or a case identity cohort (1405), any of which involves accessing the case table (1313) and the case-identity table (1223). Case identity pet involves a case-identity-pet table (1407) which keys on a combination of identity pet handle and case number. Case identity family involves a case-identity-family table (1409) which keys on a combination of identity family handle and case number. Case identity cohort involves a case-identity-cohort table (1411) which keys on a combination of identity cohort handle and case number.

Figure 15:
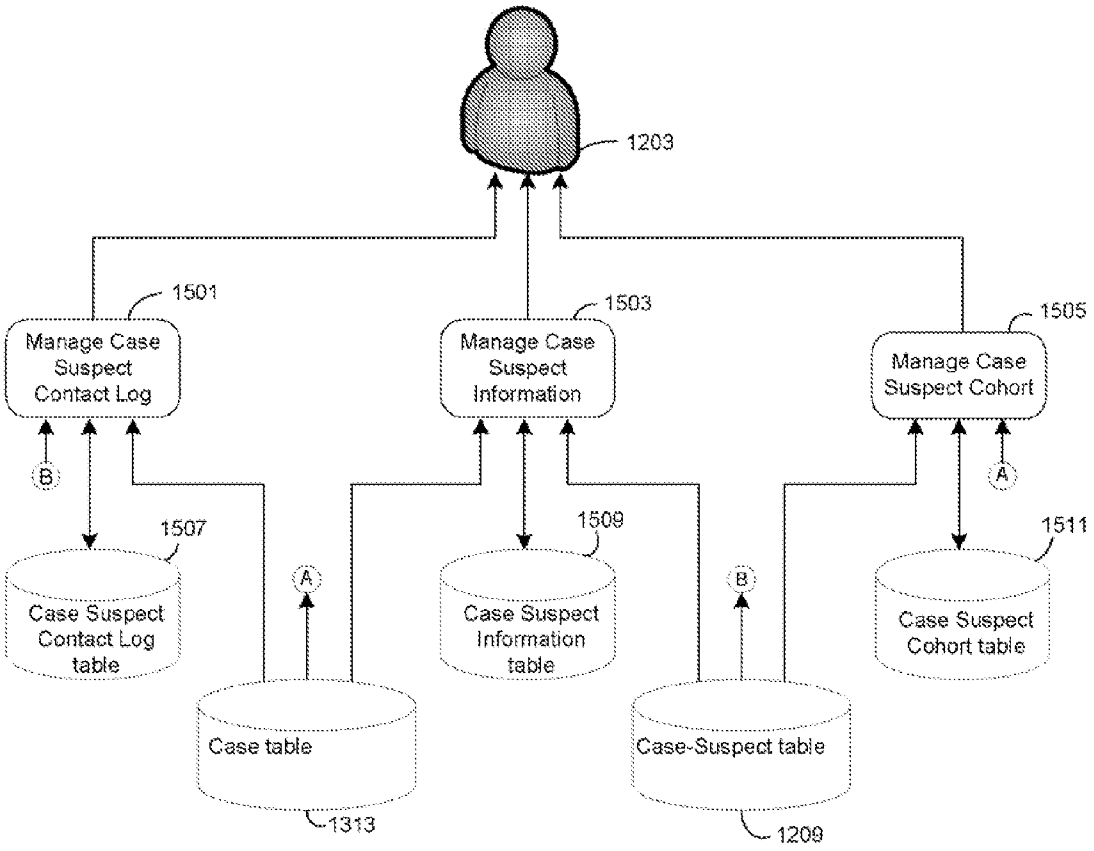
FIG. 15 depicts a database configuration of case-specific suspect management according to an embodiment of the invention.

FIG. 15 depicts a database configuration and data flow of case-specific suspect management. The investigator (1203) may manage a case suspect contact log (1501), case suspect information (1503) or a case-suspect cohort (1505), any of which involves accessing the case table (1313) and the case-suspect table (1209). The case suspect contact log involves a case-suspect contact-log table (1507) which keys on case number, suspect handle, and date and time. Case suspect information involves a case-suspect information table (1509) which keys on case number, suspect handle, and date and time. The case-suspect cohort is a category of information that involves a case-suspect-cohort table (1511) which keys on a combination of suspect cohort handle and case number.

Figure 16:
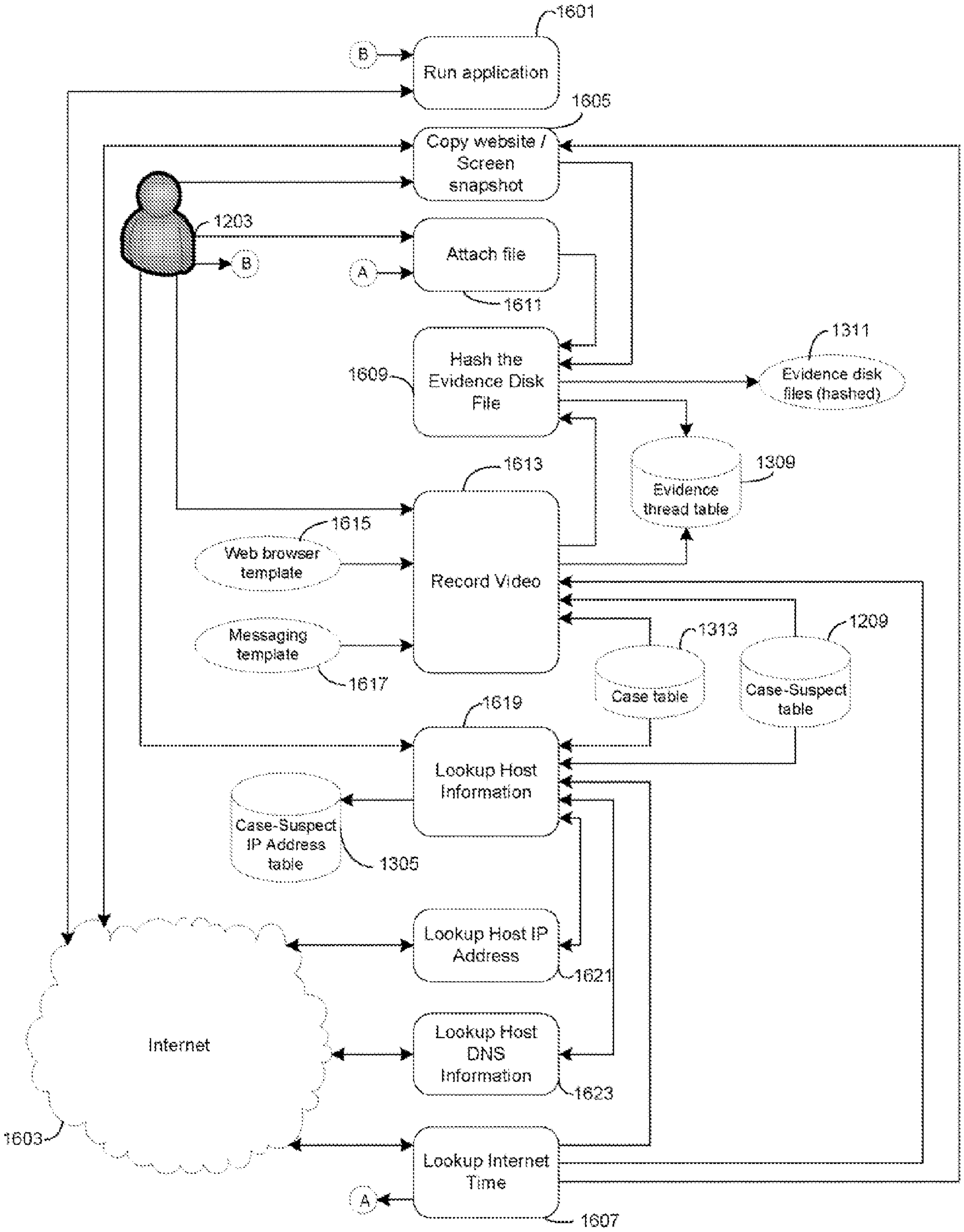
FIG. 16 depicts a database configuration of various investigator transactions according to an embodiment of the invention.

FIG. 16 depicts a database configuration and data flow of investigator transactions. The investigator (1203) can run an application (1601) accessing the Internet (1603). The investigator can obtain information by copying a website or taking a snapshot of the screen (1605) which in turn requires accessing the Internet, looking up Internet time (1607) which also accesses the Internet, and then hashing the evidence into a disk file (1609). The investigator can attach a file (1611) which involves looking up Internet time and hashing into a disk file.

Recording a video (1613) involves referencing web browser (1615) and messaging (1617) templates; accessing the evidence thread (1309), case (1313) and case-suspect (1209) tables; looking up Internet time; and hashing the result.

Looking up host information (1619) involves looking up a host IP address (1621) and DNS (1623), both of which require accessing the Internet; looking up Internet time; and accessing the case, case-suspect, and case-suspect IP address (1305) tables.

Embodiments of the invention provide various features and advantages, although not all of these may be present in an particular embodiment. An investigator can decide which undercover identity to assume and can determine any desired characteristics of that identity. This process can be referred to as identity management. The investigator can preserve any information provided by the suspect as evidence and can organize such information as characteristics that may correspond with characteristics of an undercover identity. IP addresses can be traced. A letter to a host can be prepared, asking the host to preserve information such as identity of a person conducting a transaction at a certain date and time, until a search warrant can be obtained. The console control panel can be conveniently positioned at any point on a computer video screen, for example along the left side of the screen, to provide flexibility in gathering evidence. Dates and times at which events occur and evidence is gathered are accurately preserved along with the evidence in a form that assures authentication later on. An investigation can be begun and evidence preservation initiated quickly if an opportunity arises, and once started most of the process is automatic.

The embodiments as described and illustrated are examples but should not be taken as limiting the scope of the invention. The invention is limited only by the claims.

What is claimed is:

1. An automated method of collecting and preserving evidence developed during an on-line investigation of a suspect, the method comprising:

with an online investigation and evidence collecting and preserving system:

automated storing of evidence gathered on-line by an online investigator while investigating the suspect online;

automated storing of files shared by the on-line investigator, a record of web pages accessed by the on-line investigator, and other data indicative of activities performed by the on-line investigator in the course of gathering evidence on-line;

automatically obtaining a time stamp from an external source, wherein the time stamp is indicative of when the on-line investigator gathered the evidence on-line;

automatically encoding the data indicative of activities performed by the on-line investigator in the course of gathering the evidence on-line and the evidence gathered on-line by the on-line investigator with the time stamp from the external source; and automatically generating a report that sets forth the data indicative of activities performed by the on-line investigator in the course of gathering the evidence on-line and the evidence gathered on-line by the on-line investigator and demonstrates the authenticity of the data indicative of activities performed by the on-line investigator in the course of gathering the evidence on-line and the evidence gathered on-line by the on-line investigator by reference to the time stamp from the external source.

2. An automated method as in claim 1 and further comprising, with the online evidence collecting and preserving system: automatically implementing an identity mask that prevents the suspect from detecting an internet protocol address of a computer being used by the online investigator.

3. An automated method as in claim 2 wherein automatically implementing the identity mask comprises transmitting a message to the suspect through an unpredictable network of computers.

4. An automated method as in claim 1 and further comprising, with the online evidence collecting and preserving system: establishing an undercover identity for the online investigator.

5. An automated method as in claim 1 and further comprising, with the online evidence collecting and preserving system:

automatically checking any internet protocol addresses accessed by the investigator for authenticity;

automatically storing any internet protocol addresses accessed by the investigator; and automatically storing information respecting any internet protocol address found not to be authentic.

6. An automated method as in claim 1 and further comprising, with the online evidence collecting and preserving system: using a dongle to control access to the encoded data.

7. An automated method as in claim 1 and further comprising, with the online evidence collecting and preserving system: identifying a physical location of a computer system being used by the target and including that identification along with other data when encoding the data.

8. An automated method as in claim 1 wherein automatically encoding the data comprises hashing.

9. An automated method as in claim 8 wherein encoding the data comprises hashing that returns an identification key; and wherein generating the report that demonstrates the authenticity of the data and the evidence by reference to the time stamp further comprises utilizing the identification key, whereby the method can show that the evidence and the data have not been altered.

10. The automated method of claim 1, further comprising:

generating automatically a letter to an ISP requesting that the ISP preserve at least one of the web pages accessed by the online investigator in the course of gathering evidence.

11. The automated method of claim 1, wherein the other data indicative of activities performed by the online investigator in the course of gathering the evidence comprises keystroke logging of each keystroke of the online investigator.

12. An automated evidence collection and authentication system comprising:

a computer including a central processing unit, memory, an input terminal, an output terminal, a communication element, and a security element;

communication software responsive to commands from an investigator to cause the computer to communicate electronically with a remotely located computer without revealing the investigator's identity; and investigation software operative to cause the computer to store any data obtained from the remotely located computer by the investigator together with files shared by the investigator, a record of web pages accessed by the investigator, and other data indicative of activities performed by the investigator in the course of obtaining the data from the remotely located computer, obtain a time stamp from a remotely located time source, wherein the time stamp is indicative of when the investigator obtained the data from the remotely located computer, automatically encode the data obtained from the remotely located computer by the investigator and the other data indicative of the activities performed by the investigator in the course of obtaining the data from the remotely located computer with the time stamp from the external source, and automatically generate a report that sets forth the data indicative of the activities performed by the investigator in the course of gathering the data from the remotely located computer and the data obtained from the remotely located computer by the investigator and demonstrates authenticity of the data indicative of the activities performed by the investigator in the course of gathering the data from the remotely located computer and the data obtained from the remotely located computer by the investigator by reference to the time stamp from the external source.

13. An automated system as in claim 12 wherein the investigation software functions automatically.

14. An automated system as in claim 12 wherein the communication software is operative to automatically verify authenticity of any internet protocol addresses used by the investigator.

15. An automated system as in claim 14 wherein the investigation software is operative to store any internet protocol addresses used by the investigator together with all available information respecting any internet protocol address found not to be authentic.

16. An automated system as in claim 12 further comprising a media writer responsive to the investigation software to automatically encode the report on an unalterable medium.

17. A computerized on-line evidence collection and authentication system comprising:

a computer including a central processing unit, a storage device, input and output terminals, and a communication element;

a database structure in the storage device, the database structure including:

an investigator table structured to contain data descriptive of a plurality of investigators including undercover identities and investigator handles;

a suspect table structured to contain data, descriptive of a plurality of suspects including suspect handles;

a case table structured to contain data descriptive of a plurality of investigative cases;

an evidence table structured to contain evidence collected on-line by an investigator;

a time-stamp structure for containing a time stamp indicative of a time when the evidence was collected; and investigation software in the storage device, operative to cause the computer to store in the evidence table any data obtained from a remotely located computer by an investigator through the communication element together with files shared by the investigator, a record of web pages accessed by the investigator, and other data indicative of activities performed by the investigator in the course of obtaining the data from the remotely located computer, obtain through the communication element a time stamp from a remotely located time source, wherein the time stamp is indicative of when the investigator obtained the data from the remotely located computer, store the time stamp in the time-stamp structure, encode the data obtained from the remotely located computer by the investigator and the other data indicative of the activities performed by the investigator in the course of obtaining the data from the remotely located computer with the time stamp from the external source, and generate a report that sets forth the data indicative of the activities performed by the investigator in the course of gathering the data from the remotely located computer and the data obtained from the remotely located computer by the investigator and demonstrates the authenticity of the data indicative of the activities performed by the investigator in the course of gathering the data obtained from the remotely located computer and the data obtained from the remotely located computer by the investigator by reference to the time stamp from the external source.

18. A computerized system as in claim 17 wherein the database structure comprises cross-references between suspects and cases and between investigators and cases.

19. A computerized system as in claim 18 wherein the evidence table comprises a structure for containing the evidence and the time stamp in hashed form.

20. A computerized system as in claim 17 wherein the database structure comprises a table structured to contain categorized data pertaining to an undercover identity.

21. A computerized system as in claim 17 wherein the database structure comprises a table structured to contain categorized data pertaining to a suspect.

* * * * *